E. HEDENSKOOG.
AUTOMATIC PIN SETTING MACHINE.
APPLICATION FILED SEPT. 6, 1913. RENEWED MAR. 9, 1916.
1,190,645.
Patented July 11, 1916.
7 SHEETS—SHEET 2.
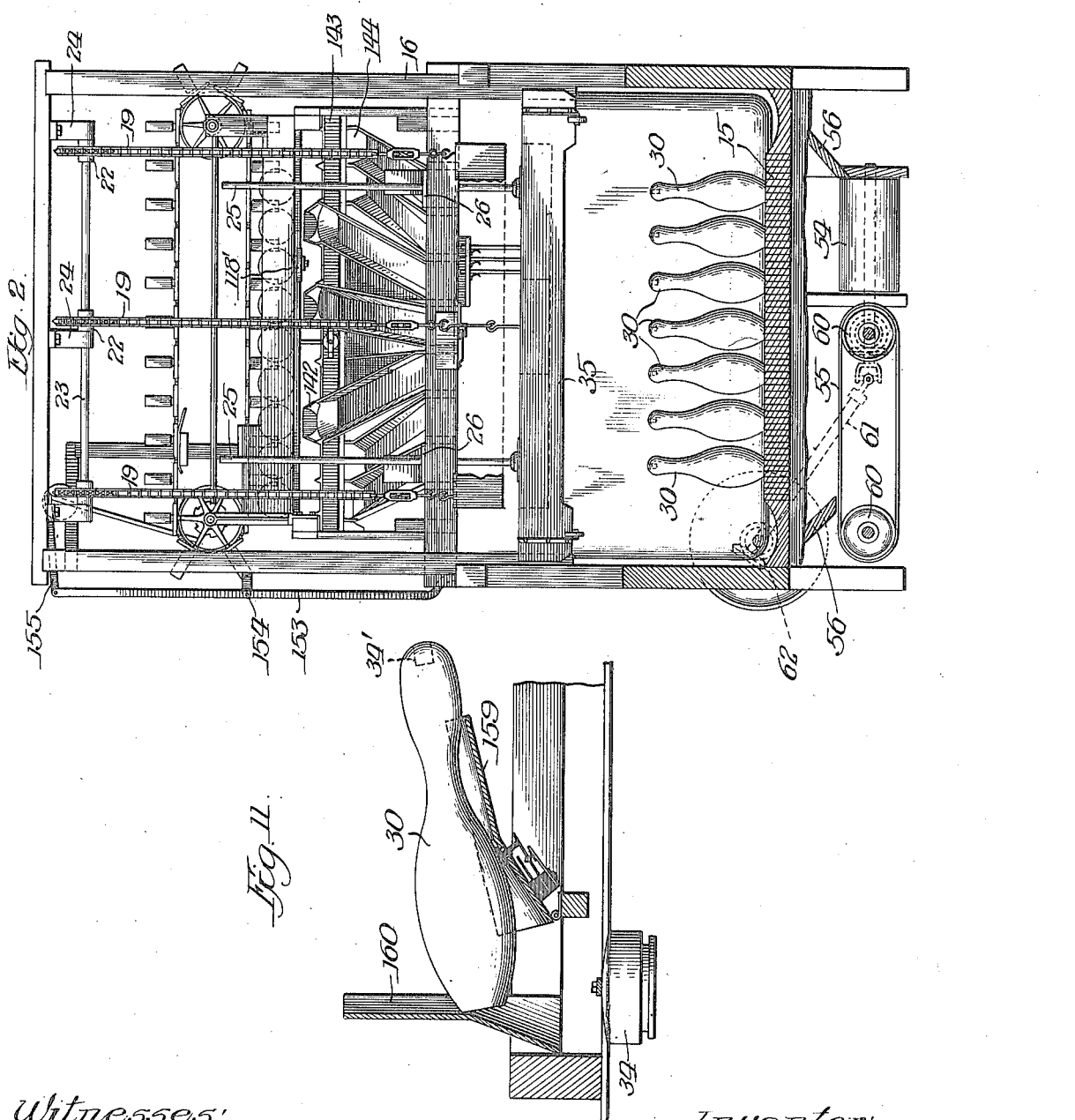

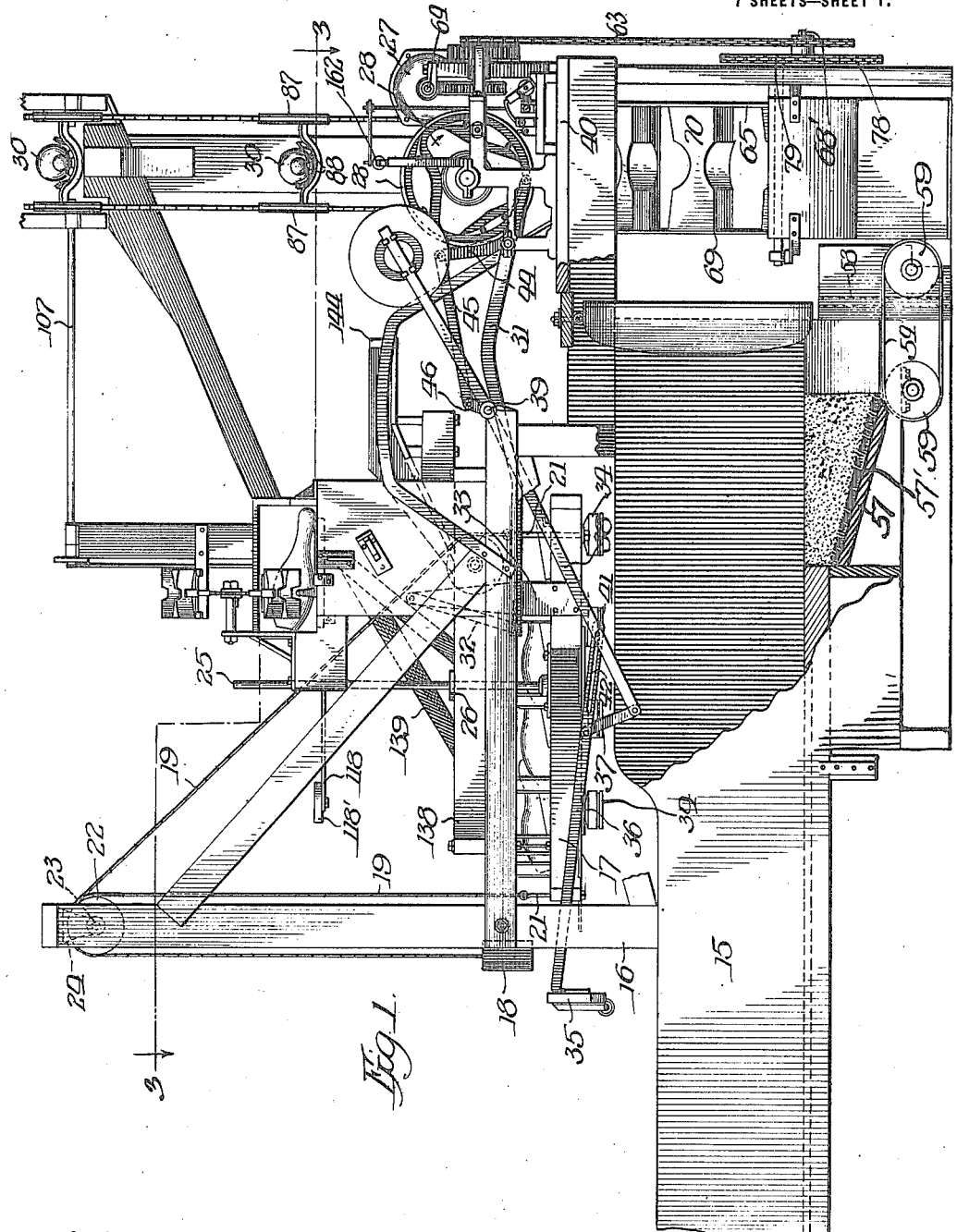

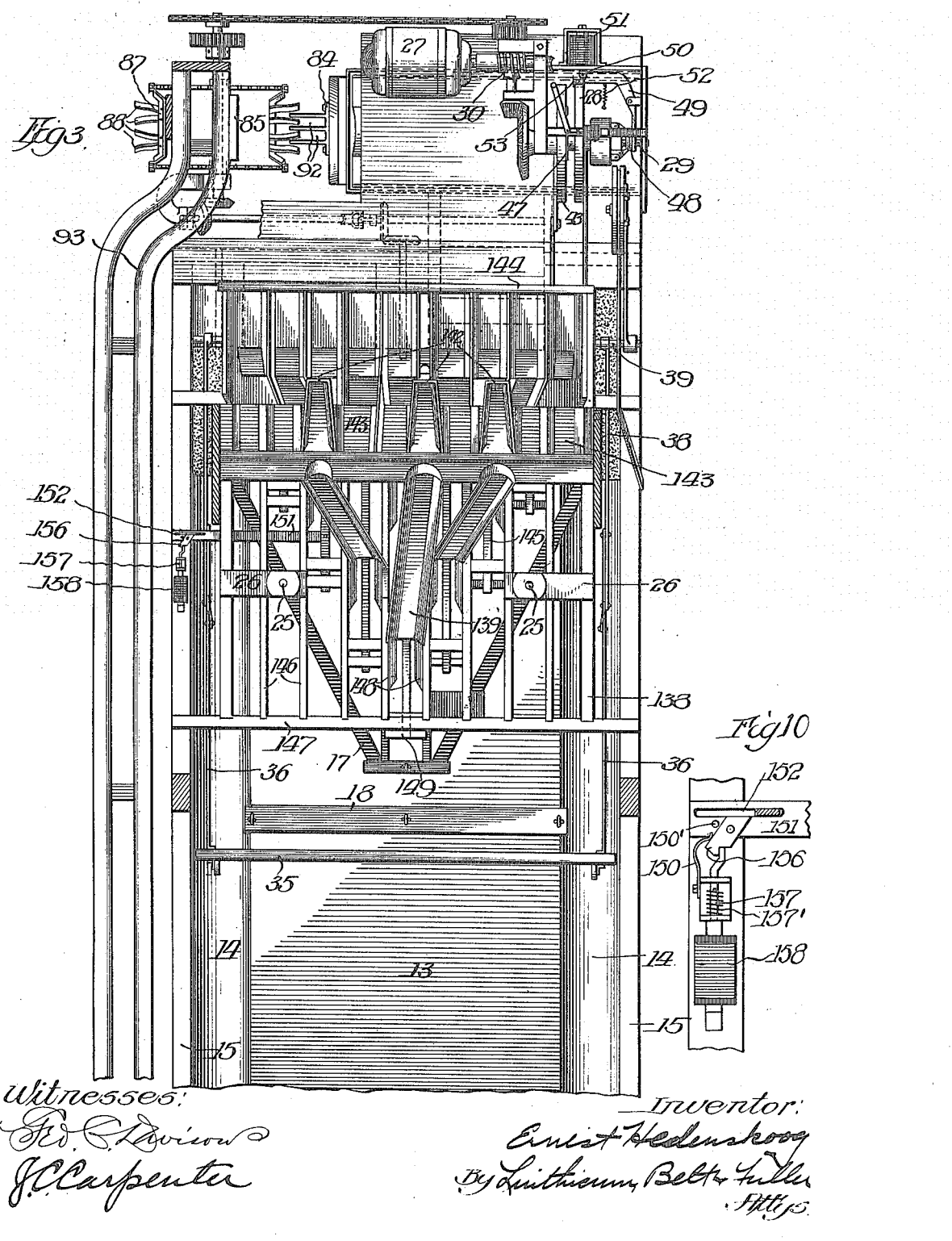

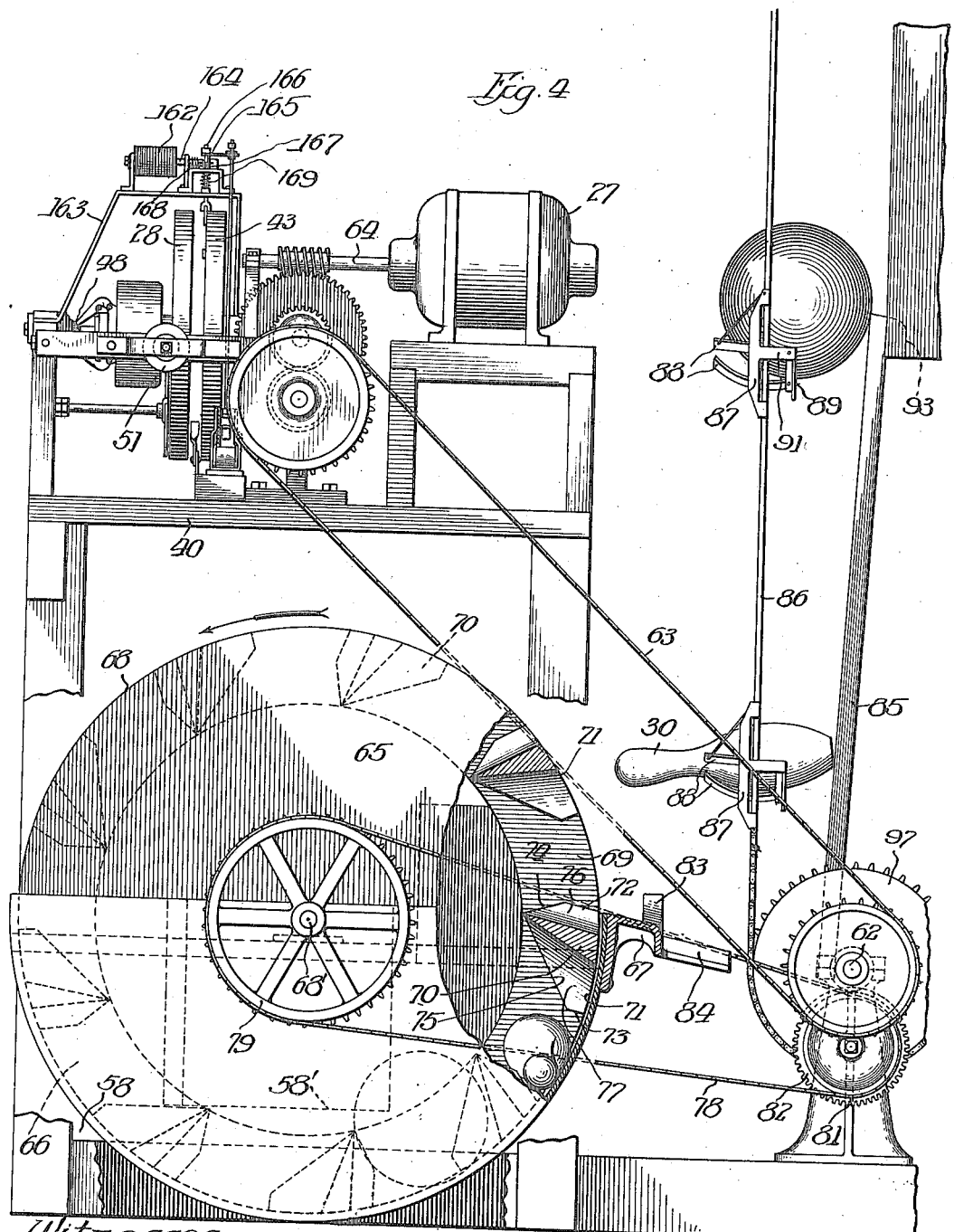

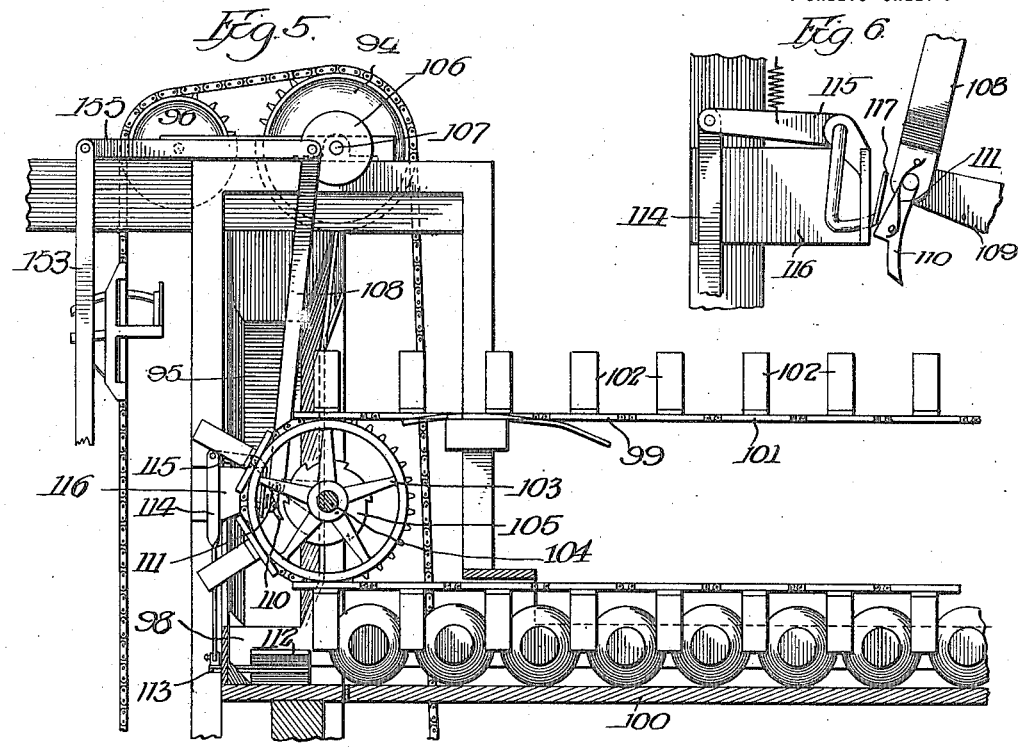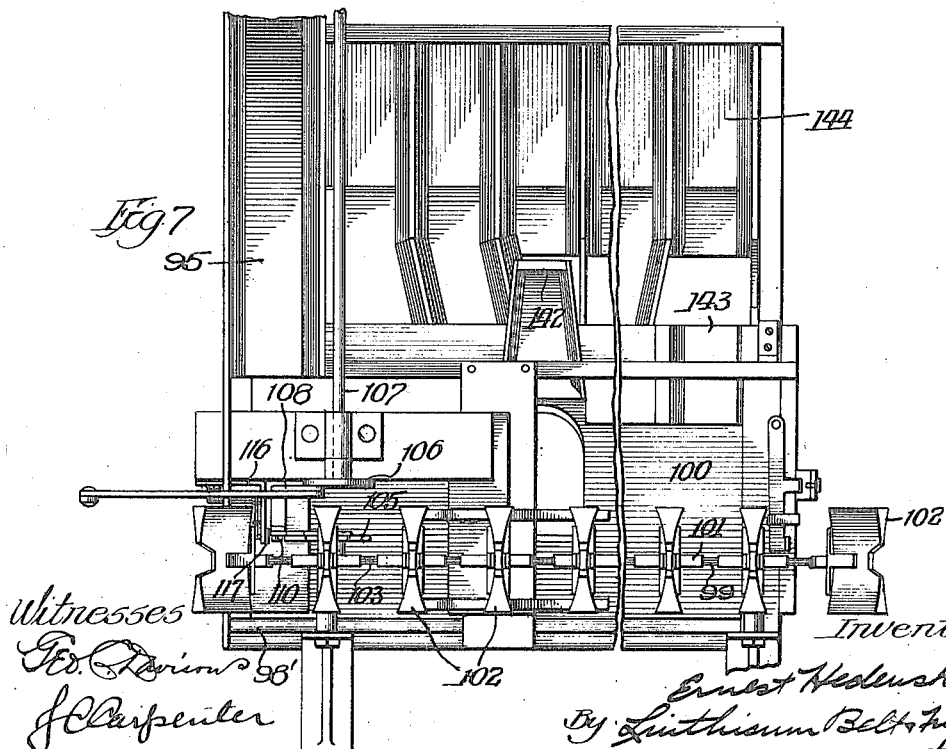

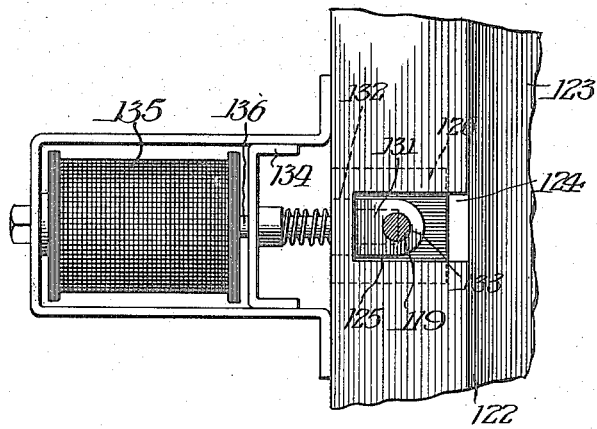
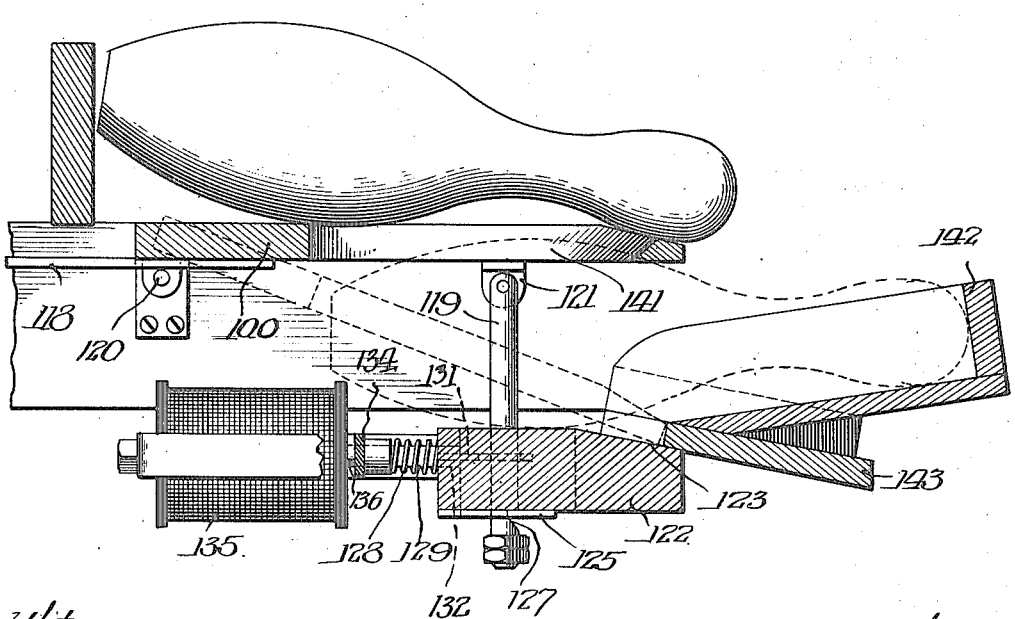

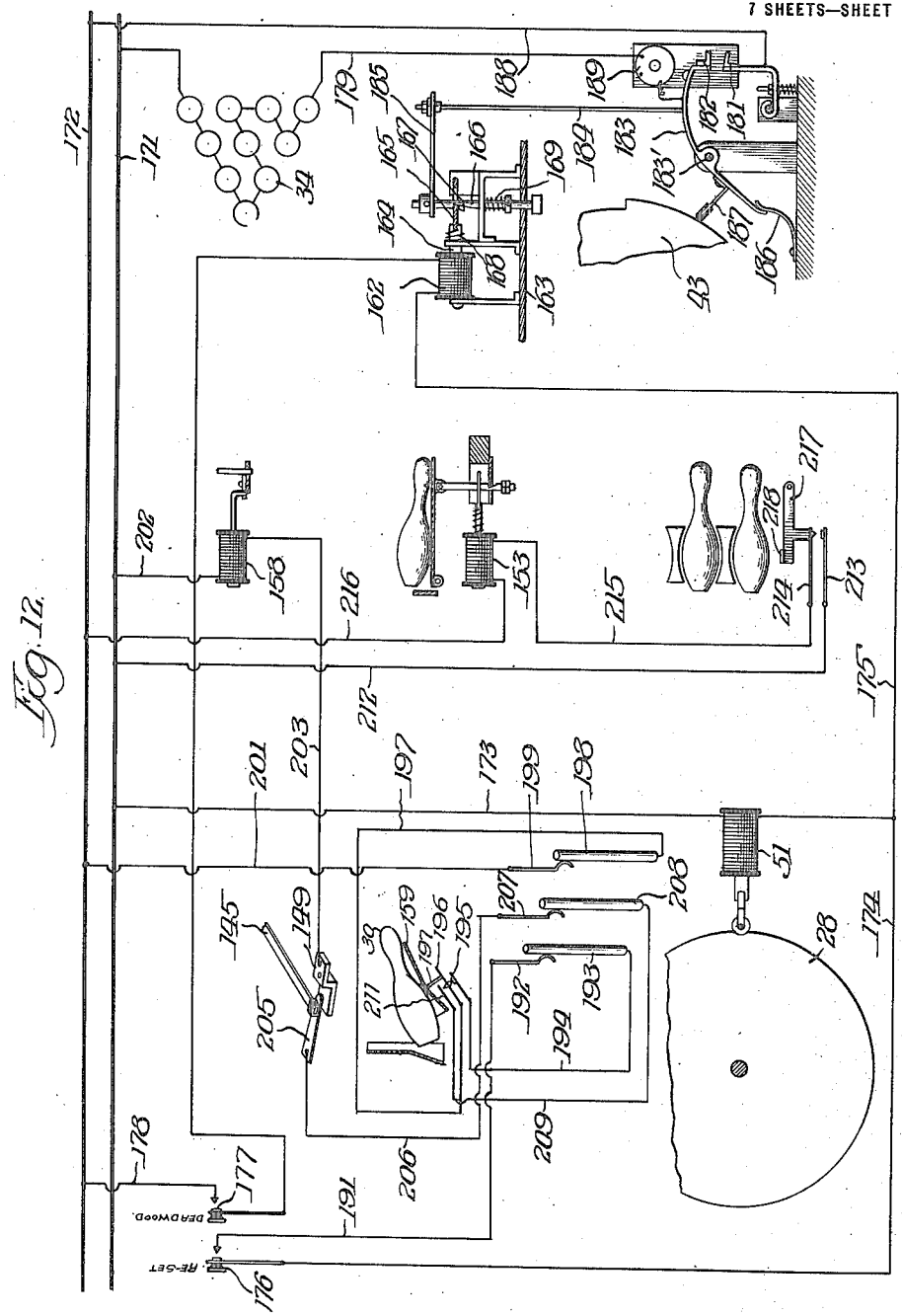

UNITED STATES PATENT OFFICE.

ERNEST HEDENSKOOG, OF MUSKEGON, MICHIGAN, ASSIGNOR TO THE BRUNSWICK-BALKE-COLLENDER COMPANY, OF CHICAGO, ILLINOIS, A CORPORATION OF DELAWARE.

AUTOMATIC PIN-SETTING MACHINE.

1,190,645.   Specification of Letters Patent.   Patented July 11, 1916.

Application filed September 6, 1913, Serial No. 788,412. Renewed March 9, 1916. Serial No. 83,172.

*To all whom it may concern:*

Be it known that I, ERNEST HEDENSKOOG, a citizen of the United States, residing at Muskegon, in the county of Muskegon and State of Michigan, have invented certain new and useful Improvements in Automatic Pin-Setting Machines, of which the following is a specification.

The object of the present invention is broadly to provide a machine to do all the work of a pin boy in setting pins upon a bowling alley and returning the balls to the player's position, including mechanisms and devices wholly under control of the player which will remove the deadwood from the alley, deliver the balls to the return track and the pins to a pin setter frame, and set the pins in proper position upon the alley bed when the latter is cleared.

The invention has relation to the machine forming the subject matter of my companion application filed Sep. 6, 1913, Serial No. 788,410 and presents certain novel mechanisms and devices and combinations and arrangements of parts which may be employed in such a machine.

On the drawings, Figure 1 is a side elevation of a pin setting machine embodying my new and improved mechanisms shown in position upon a bowling alley with parts of one of the alley side walls broken away to more completely disclose the same. Fig. 2 is a front elevation of the same with the alley shown partially in section and with the numerous mechanisms at the rear of the machine removed. Fig. 3 is a horizontal sectional view taken on the line 3—3 of Fig. 1. Fig. 4 is an enlarged detail view of the actuating mechanisms and a part of the elevating mechanism. Fig. 5 is an enlarged detail view of the mechanism for collecting the pins upon the assembly shelf. Fig. 6 is an enlarged view of a part of the mechanism shown in Fig. 5. Fig. 7 is an enlarged detail plan view of the assembly shelf and distributing chutes. Figs. 8 and 9 are enlarged detail views showing the manner in which the pins are removed from the assembly shelf into the distributing chutes. Fig. 10 is an enlarged detail view of the means provided to control the discharge of a set of pins from the distributer to the pin setter. Fig. 11 is an enlarged detail sectional view of a portion of the pin setter frame showing one of the pin lifting magnets in position to lift a pin preparatory to the action of the sweeper in moving the deadwood. Fig. 12 is a diagrammatic view of the various electrical circuits provided to control the different mechanisms and devices.

A pin setting machine in which are embodied the various mechanisms and devices forming the subject matter of the present invention is shown set up at the pit end of a bowling alley (Figs. 1–3). The alley comprises the usual bed 13, gutters 14 and side walls 15 upon the latter of which a suitable main frame 16 is supported. A pin setter comprising a frame 17 and various other parts, which will be later described, is movable vertically in this frame. The pin setter frame 17 is held in elevated position by a counterweight 18 which is connected to the frame 17 by a plurality of chains 19, each secured at one end to the counterweight and at the other end to a hook 21 fastened in the pin setter frame. The chains 19 are trained over pulleys 22 carried by a shaft 23 which is rotatably supported from the main frame 16 by suitable brackets 24. The pin setter is guided in its vertical movements by a pair of rods 25 rigidly fixed to the frame 17 at their lower ends and slidably extending through bearing plates 26, suitably secured above the elevated or normal position of the setter. Movement is imparted to the pin setter by a constantly operating motor 27 which also serves to furnish the power for various other mechanisms as will be later described.

A cam 28 for governing the movement of the pin setter is loosely mounted upon a continuously rotating shaft 29, connected by suitable gearing 30 to the motor 27. The pin setter is operated by this cam through a lever 31 and a link 32 connecting the cam and the setter. The lever has one arm operatively engaging the cam and the other pivotally connected to one end of the link 32. The other end of this link is pivotally fastened to an upwardly extending arm 33 carried by the pin setter frame. Viewing Fig. 1 it will be noted that the oscillation of the lever by the cam will cause the frame to reciprocate vertically.

Ten electromagnets 34 (Figs. 1, 11) are carried beneath the pin setter frame and are normally located directly above the pin spots on the alley bed. The magnets are adapted to be brought into contact or approximately into contact with the tops of the standing pins when the pin setter frame is moved vertically by the cam 28. An insert 34' of soft iron or other metal adapted to be attracted by one of these magnets when an electric current is passed through its winding is fixed in the top of each pin 30. As in my companion application, suitable connections are provided for energizing these magnets by the time they contact with pins standing on the alley bed whereupon upward return movement of the pin setter frame to the position shown in Fig. 1 will lift these pins out of the way of a sweeper 35 which is automatically moved along the alley immediately after the pins are thus lifted to sweep the pins which have been knocked down and which are commonly called "deadwood" from the alley bed and from the gutters.

The sweeper in the present instance is provided with a pair of rearwardly extending arms 36, each of which is connected by a link 37 with an arm 38 mounted upon a shaft 39 extending transversely of the alley. Each arm 36 is also directly connected to its corresponding arm 38 by a pin 41 provided upon the arm 38 and engaged within a slot 42 at the end of the arm 36. Angular movement of the shaft 39 in a counter clockwise direction, viewing Fig. 1, will move the arm 38 downwardly and pull the sweeper along the alley toward the pit, the dual connections between the arms 36 and 38 maintaining the sweeper in substantially vertical position. The shaft 39 is oscillated to thus move the sweeper along the alley and to return it to normal position by a cam 43 mounted upon the shaft 29 and rigidly connected to and movable with the cam 28 which actuates the pin setter. The cams and the motor are located in the present instance behind and above the pit upon a suitable platform 40. Connection is made between the cam 43 and the shaft 39 through a controlling lever 44 having a common pivotal axis with the lever 31, a link 45 pivotally connected to the free end of the said lever, and an arm 46 rigid upon the shaft and pivotally connected with the said link so that movement of the lever 44 by the cam 43 will impart a corresponding movement to the shaft 39 through the link 45 and the arm 46.

The cams 28 and 43 are identical in construction with the cams provided in my companion application and are controlled and actuated in like manner so that detail description of them and their controlling means is deemed unnecessary. It should be stated, however, that the cams are provided with suitable grooves into which the ends of the levers 31 and 44 are directed to move the frame and sweeper as described and that both cams are mounted upon a single collar 47 (Fig. 3), loosely embracing the shaft 29 and adapted to be connected thereto by a friction clutch collar 48 mounted upon and turning with the shaft 29. The clutch collar 38 is moved into engagement with the collar 47 to throw in the clutch by a lever 49 to one arm of which the collar 38 is connected. An armature 50 for an electromagnet 51 is formed upon the arm of the lever 49 distant from the collar 38. When the magnet is energized the armature is attracted and the lever moved to throw in the clutch. A spring 52 normally pulls the lever 49 about its pivotal axis to maintain the clutch inoperative and a roller 53 carried by the arm of the lever 49 provided with the armature 50 normally engages a suitable recess in the cylindrical face of the cam 28. When the magnet 51 is energized the lever 49 is swung outwardly against the tension of spring 52, moving the roller 53 out of the recess in the cam 28 and throwing in the clutch so that the cams start to rotate with the shaft 29. As the cam 28 revolves, its cylindrical face moves in contact with and under the roller 53 thus maintaining the clutch thrown in until the cams have made a complete revolution and the recess in the cylindrical cam face is in position to again receive the roller, at which time the spring 52 pulls the lever 49 to normal position, releasing the clutch and engaging the roller in the recess to stop the cams.

When it is desired to remove the deadwood from the alley, the magnet 51 is energized and a single revolution described imparted to both cams, the cams first lowering the pin setter frame to engage the pins standing upon the alley and lift them above the path of travel of the sweeper, then moving the sweeper along the alley and subsequently lowering the frame again to replace the pins when the sweeper has finished its operation.

The pins removed from the alley bed and from the gutters are dropped into the alley pit where they are conveyed by suitable mechanisms to the pin setter. In the order of their operation these mechanisms may be listed as follows:—A mechanism for removing the pins from the alley pit; a transfer device for receiving the pins from the alley pit; an elevating conveyer for receiving the pins from the transfer device; an assembly mechanism to which the pins are delivered by the elevating conveyer; and a distributer for receiving the pins from the assembly mechanism and delivering them to the pin setter.

The mechanism for removing the pins from the pit, (Figs. 1, 2) is continuously operated and comprises a pair of horizontal conveyers 54 and 55 disposed and moving at right angles to each other in the bottom of the pit. In the present instance this pit is constructed of inclined side walls 56 and an inclined front wall 57, these walls extending from the side and front boundaries of the pit over the adjacent edges of the conveyers 54 and 55. The front wall 57 and the adjacent portions of the side walls 56 may be covered with a mat 57'. The conveyer 55 travels transversely of the alley bed from adjacent one edge of the pit to substantially its center and the conveyer 54 travels longitudinally of the alley toward the rear from the lower end of the inclined front wall 57 through an opening 58' in the back wall 58 of the pit (Fig. 1) to adjacent the drum of the transfer mechanism. When pins and balls fall or are swept into the pit, the inclined walls 56 and 57 direct them onto one or the other of the conveyers 54 and 55. If they fall upon the conveyer 55 they are carried to the conveyer 54 and deposited thereon, the conveyer 54 thus delivering all the pins and balls through the opening 58' into the transfer mechanism. The conveyers 54 and 55 are mounted upon rollers 59 and 60 respectively, the forward roller of each conveyer being continuously actuated by suitable gearing 61 from a main power shaft 62 driven by gearing 63 from the shaft 64 of the motor 27.

The transfer mechanism (Figs. 1, 4) comprises a constantly rotating drum 65 mounted in a semi-cylindrical casing 66 at the top of which is located an inclined shelf 67. The rotating drum consists in the present instance of a circular end wall 68 rigidly fixed upon a shaft 68' which is journaled in the sides of the semi-cylindrical casing 66, a ring 69, and a plurality of flights 70 connecting the ring and circular end wall. The flights 70 are disposed at regular intervals adjacent the outer edge of the circular end wall and ring and are identical in shape. A description of one of them will suffice, and I will describe a flight as it appears on reaching the top of the casing in position to deposit a pin or ball upon the shelf 65. The outer face 71 is curved and disposed in coincident alinement with the periphery of the ring 69 and circular wall 68 to both of which the flight is fastened at its ends. The upper face 72 is flat and slopes upwardly from the outer face 71. The bottom face 73 is relatively narrow and is connected within the drum to the upper face 72 by two flat faces 74 and 75. These two flat faces meet above the vertical center of the flight at an acute angle. The length of the flight is only slightly greater than the length of a pin.

Both the balls and the pins on being delivered through the opening 58' by the conveyer 54 pass through the ring 69 into the drum and fall upon the moving flights where they are jostled and tumbled about until one by one each is engaged by a flight and is carried upward and deposited on the shelf 67. A pin is supported, during the upward travel of the flight carrying it, partially by the casing and partially by the flight, the pin resting upon the upper face 72 with its head end extending toward either end wall of the flight. As the flight ascends the pin rolls or slides upon the casing and over its edge onto the shelf 67. Each flight is cut away centrally of its length to provide upper and lower recesses 76 and 77. When a ball is lifted to the shelf by a flight it rests in the recess 76 which prevents it from rolling lengthwise of the flight and like the pins rolls or slides on the casing. The lower recesses 77 permit the flights to be located close together as a ball carried by one flight may extend into the lower recess 77 of the next preceding flight in position to roll onto the shelf 67 when the flight lifts it above the top edge of the casing.

The drum receives its power from the power shaft 62 through a sprocket chain 78, trained over a sprocket wheel 79 mounted upon the shaft 68' of the drum and over a sprocket wheel 81 secured to a gear 82 which is continuously driven by the power shaft 62.

The shelf 67 is inclined toward the top edge of the casing over which the pins and balls are delivered and is provided at its sides with upwardly extending lips 83, one of which lips is engaged by the head of the pin as the pin rolls down the shelf. When the head of the pin engages one of the lips 83 it is held until the body of the pin has rolled around and the butt end of the pin is directed down the shelf. From this position the pin slides butt end foremost onto a slotted transversely curved plate 84 which forms the lower part of the shelf 67. The pin slides down this plate until it comes in contact with the lower end of an inclined board 85, which forms an abutment for the pins and balls, holding them in position to be received by the elevating mechanism. The lips 83 are spaced a sufficient distance apart to permit a ball to roll in a straight line from the flight which has lifted it to the board 85.

An elevating conveyer moves continuously and passes between the plate 84 and the abutment 85 (Figs. 4 and 5). It picks up the pins and balls as fast as they are delivered to the shelf 67 and carries them respectively to the assembly mechanism and the ball return track. This conveyer comprises a pair of continuously moving parallel chains or belts 86 between which carriers 87 are mounted at appropriate intervals. Each carrier is composed of four fingers 88 secured together at their ends within the travel of the belts by a curved semicircular member 89 which is fastened at its end to both the chains by suitable fastening means 91. Two slots 92 are provided in plate 84 of the shelf and through these slots the two central fingers 88 of the carrier 87 pass, the two outside fingers passing the outer sides of this portion of the self. The latter fingers are mounted above the two inner fingers and all four fingers are curved to form a cup, as will be seen by comparing Figs. 3 and 4, in which the pin rests during its upward travel. The carriers 87 of the conveyer are so spaced apart that one of them passes the shelf 67 immediately after each flight of the drum passes the top of the casing 66 so that each pin and ball is removed from the shelf before opportunity is given for a second pin or ball to be delivered thereto. When a ball rolls onto the shelf 84 it passes between the lips 83, onto the plate 84 down which it rolls until it comes to rest in contact with an upwardly extending and outwardly inclined board 85 so that the ball will be engaged by a carrier and lifted to the return track, the curved form of the plate 84 preventing the ball from rolling off at the sides. As the ball is elevated by the conveyer it is supported partially by the inclined wall and partially by the curved member 89 of its carrier, the fingers of the carrier playing little or no part in placing a ball upon the return track. When the ball reaches the top of the board 85 the further movement of the chains 86 causes it to roll over the upper end of the board onto the return track 93 down which it rolls to the player's end of the alley.

The pins are supported wholly in the carriers 87 and are carried past the top end of the board 85 until the chains pass over a pair of pulleys 94 (Fig. 5) at the end of their upward travel which causes the tilting of the carriers so that the pins are dropped into a chute 95. From the pulleys 94, the chains 86 are trained over smaller auxiliary pulleys 96 before starting upon their downward travel in order that the chains will be disposed at a slight angle to the horizontal while the pins are being deposited in the chute 95. This arrangement permits the pins to slide gently from the carriers into the chute. At the bottom the chains mesh with a pair of sprocket wheels 97 (one for each chain) mounted upon the power shaft 62 and rotating constantly therewith to impart a continuous movement to the conveyer. The pins slide down the chute 95 butt ends foremost to the assembly mechanism (Figs. 5, 6). On arriving at the bottom of the chute, each pin falls upon a table 98 and actuates a trip mechanism, which will be later described, and which controls the movement of an assembly conveyer 99, causing the conveyer to engage the pin and move it from the table onto an assembly shelf 100. The table 98 is provided with retaining walls 98' at its front, rear, and outer sides to prevent the pin from falling from the table. The assembly conveyer consists of a chain or belt 101 upon which outwardly extending blades 102 are arranged at appropriate intervals. The chain 101 is trained over and meshes with sprocket wheels 103 mounted on shafts 104 supported above the ends of the shelf 100 from the main frame 16 of the pin setting machine. A ratchet wheel 105 is rigidly mounted on the hub of the sprocket wheel adjacent the chute 95. The assembly conveyer receives its movement from the following mechanism: A crank disk 106 is mounted upon the shaft 107 with the front pulley 94, the shaft, crank disk and pulley being rigidly fastened together so that the crank disk is caused to continuously rotate by the action of the elevating conveyer. A link 108 is pivotally connected with an arm 109 mounted loosely upon the shaft 104 nearer the chute so that the reciprocation of the link imparts an oscillatory movement to the arm. A pawl 110 is pivoted at the junction of the link 108 and arm 109 and is adapted to engage the teeth of the ratchet wheel 105. A spring 111 normally maintains the pawl out of engagement with the said ratchet teeth so that the pawl reciprocates in an arc above the teeth.

The trip mechanism comprises a leaf 112 pivoted on the table 98 in position to support the pin while it rests upon the table. Beneath the leaf 112 an arm 113 extends outwardly through the outer wall 98' of the table and the end of this arm is connected by a vertical link 114 with a bent lever 115, fulcrumed in a bracket 116 in the frame of the pin setting machine. The free arm of the lever is formed as at 117 to engage the pawl 110 and force it inwardly into engagement with the teeth of the ratchet when the lever is moved by a pin falling on the leaf 112. As the pins are collected upon the shelf 100, they are moved toward the right viewing Fig. 5.

The shelf is pivotally mounted at its edge adjacent the player's end of alley (Figs. 1, 8, 9) in brackets 120 fastened to the main frame, and is normally held in horizontal position by a mechanism to be now described until a full set of pins has been collected thereon at which time the said mechanism automatically releases the shelf and permits it to swing downwardly and deliver the pins to the distributer which is supported beneath the shelf by the main frame.

Extending out from the front edge (the pivotal edge) of the shelf is an arm 118 upon the end of which a counterweight 118' is fastened, the specific gravity of the said weight being sufficient to maintain the shelf in normal or horizontal position when no pins are carried thereby. The shelf is positively maintained in this position while the pins are delivered thereon by a vertically disposed rod 119, pivotally connected to the said shelf at 121 (Figs. 8, 9). A transversely disposed bar 122 of wood or other suitable material having its upper face cut away adjacent its rear edge at 123 is rigidly fastened in the main frame beneath the shelf. The rod 119 extends through a rectangular vertically-disposed slot 124 in bar 122 and this slot 124 extends transversely of the bar and is of sufficient length to permit the rod 119 to oscillate through a limited arc about is pivotal connection 121 with the shelf 100. A plate 125 is fastened to the lower surface of the bar 122 and is provided with a slot 126 immediately beneath the slot 124. The rear edge of the slot 126 is disposed inwardly of the rear wall of the slot 124 to permit the adjacent edge of the plate 125 to engage a notch 127 provided in the rod 119 to hold the shelf in horizontal position. The notch in the rod 119 is caused to engage this edge of the plate 125 by a spring 128, embracing a rod 129 to one end of which is secured a horizontal plate 131 slidably mounted in a recess 132 in the bar 122 communicating with the slot 124. The plate 131 is provided with an aperture 133 through which the rod 119 is loosely disposed and the outer end of the rod 129 is disposed through a bearing bracket 134 fastened on the bar 122. The spring presses against the inner face of this bracket and against the adjacent end of the plate 131 to maintain the rod 119 in engagement with the plate 125. The rod 129 and the plate 131 are pulled toward the front of the machine to release the rod 119 from the plate 125 by an electromagnet 135 attracting an armature 136 provided upon the front end of the rod 129. When the magnet 135 is energized the rod 129 and plate 131 are pulled against the force of the spring 128, moving the rod 119 away from the rear of the slot 124, disengaging the edge of the plate 125 and the notch 127 so that the weight of the pins upon the shelf swings the shelf downwardly until its rear edge rests upon the inclined face 123 of the bar 122, the rod 119 sliding freely through the aperture in the plate 131.

The circuit which delivers the energizing current to the magnet 135 is shown in Fig. 12 and will be described later in connection with the various circuits provided for energizing the several magnets used in the controlling and timing of the pin setting machine. It may be stated at this point, however, that the foremost pin of the set moves two terminals located at the end of the shelf distant from the chute 95 into contact to complete the circuit when the last pin of a full set is received upon the shelf.

When the shelf 100 is released as just described the pins are delivered to a distributer mounted above the pin setter frame 17 (Figs. 1, 3, 8, 9). This distributer comprises a frame 138 preferably located immediately beneath the assembly shelf and the pins are transferred from the shelf to the frame by ten inclined and suitably formed chutes, generally designated 139 which distribute the pins in the frame in accordance with the pin spots on the alley bed. The chutes for the three pins upon the shelf to be set up in the two front rows of the alley terminate just rearwardly of the rear edge of the shelf. In the present instance these three pins are those which occupy the third, sixth and eighth positions counting from the left in Fig. 2 although it will be readily apparent that the construction may be varied to divert pins from other positions into the two front rows. Three apertures 141 are provided in the shelf beneath these pins through which the pins slide butt end foremost when the shelf is in lower position as shown in dotted lines Fig. 8. As the shelf is tilted each of these pins slides down the shelf until the head of the pins abuts against the upper end wall 142 of the chute whereupon the butt end of the pin drops through the aperture 141 and the pin slides down the chute, the whole pin passing through the aperture 141. The pins to be set up in the two rear rows on the alley bed slide from the shelf across an inclined ribbed board 143 (Fig. 3) and off this board into the upper ends 144 of the remaining chutes which are located rearwardly of and below the ends 142 of the other three chutes. The upper ends of these chutes are horizontal (as seen in Fig. 1), the horizontal portions of the chutes, however, being of insufficient length to support the pins as the centers of gravity of the pins fall outside these horizontal portions and cause the pins to gently slide down the chutes beneath the shelf 100 and the board 143 into the distributing frame. It will be noted that although the pins leave the shelf with the head ends foremost, they are delivered to the distributing frame butt end foremost so that the heads of the pins lie toward the rear of the alley.

The distributing frame 138 is adapted to hold the pins in inclined position with the butt ends resting upon a movable lattice-like support 145 (Fig. 3). This frame 138 is composed of eight bars 146 disposed longitudinally of the machine and rigidly fastened at their ends to cross bars 147 supported from the main frame. These eight bars are evenly spaced apart to provide seven channels within the distributing frame and upon adjacent faces of the bars within each channel is provided a pair of inclined blocks 148, the two outer channels on each side being each provided with one pair of blocks and the remaining three central channels each with two pairs, the pairs of blocks being suitably located in the frame to correspond to the arrangement of the slots on the alley bed. The support 145 is normally disposed beneath these blocks so that the pins are retained on the blocks by the support. This support is slidably mounted in suitable brackets 149 (the front bracket 149 only being shown) and is provided with an arm 151 extending toward the left hand side of the machine and having an elongated slot 152 in its outer end. A mechanism (Figs. 2, 3, 10) which will now be described is provided to engage this arm at desired intervals to move the support from beneath the channels, permitting the pins to slide down the inclined blocks through the support into the pin setting frame. An arm of a continuously oscillating vertical lever 153 is disposed through the slot 152. This lever is pivoted on the main frame at 154 and has its other arm connected by a link 155 to the crank disk 107 which imparts movement to the assembly conveyer. A plate 156 is pivotally mounted upon the arm 151 adjacent the slot and is pulled by a spring 150 to extend across the slot into engagement with the arm of the lever 153 and a stop 150' is provided to restrain the movements of the plate within proper limits. When the plate is in engagement with the end of the arm the support will be reciprocated as the lever is oscillated and moved from beneath the pins carried in the frame 138, permitting them to drop into the pin setter. The plate 156 is normally retained in inoperative position by a bar 157 slidably mounted on the main frame. This bar is pulled by a spring 157' into position to engage the plate during the travel of the lattice to withdraw the plate from operative engagement with the end of the arm of the lever 153. A magnet 158 is provided to retract the bar 157 upon desired occasions to disengage the said bar from the plate when the pins are to be transferred from the distributing frame to the pin setter frame.

When the pins drop into the pin setter frame they fall upon inclined pivotally mounted guides 159 (Fig. 11) with the butt ends resting against upright, stationary guides 160 as in my companion application. The pins are deposited upon the alley bed by lowering the pin setter and righting the inclined guides. Before the pin setter is moved downwardly into position to perform this operation, the sweeper is drawn along the alley by the cam 43 to clear the alley. The setter is lowered by the cam 28, the lever 31, and the link 32 which have all been described in connection with the action of the setter during the removal of deadwood from the alley. The cam 28, however, imparts a longer travel to the setter in setting the pins than in the operation before described and lowers the setter to position adjacent the alley bed. The guides 155 are automatically raised and the magnets 34 are moved from above the pin spots through a mechanism like the mechanism provided for the same purpose in my companion application.

The two cams 28 and 43 are normally arranged for setting the pins and to permit the device to remove the deadwood it is necessary that a re-arrangement be made. To this end a magnet 162 (Figs. 1, 4, 12) is provided to temporarily arrange the cams for performing this operation. This magnet is mounted above the cams on a bracket 163 and is provided with a horizontally sliding armature 164 upon the end of which distant from the magnet is fastened a detent 165. A vertically movable rod 166, having a notch 167 in its side, is extended downwardly through the bracket 163. The detent 165 normally engages the notch 167 and holds the rod in elevated position. The detent is pushed toward the rod by a spring 168, and the magnet pulls the detent out of engagement with the rod when a current passes through the windings of the magnet. A second spring 169 is provided to move the rod downwardly when the rod is released by the detent. The downward movement of the rod actuates mechanism for directing the ends of the levers 31 and 44 in proper grooves. This mechanism is described in detail in my companion application as are also the construction and operation of the magnet 162 and the various elements affected by its energization.

In Fig. 12 the various circuits employed in the pin setting machine are shown diagrammatically. In this view 171 and 172 represent respectively positive and negative main line wires which may for the purpose of this invention be considered a source of electrical energy. From the wire 171 a wire 173 leads to the magnet 51 which actuates the clutch to operatively connect the cams to the constantly rotating shaft 29. From this magnet two lines 174 and 175 lead respectively to two switch buttons 176 and 177 which are adapted to be pressed by a player to complete respectively the circuits controlling the pin setting machine in making a re-set and in removing the deadwood and which are preferably located at the player's end of the alley. In the wire 175 of the deadwood circuit the magnet 162 is inserted and from the deadwood button the wire 178 leads to the positive main line wire 172. When the deadwood button is pressed, both the magnets 51 and 162 are energized, the magnet 162 arranging the cams to properly direct the sweeper and pin setter frame for the removal of deadwood and the magnet 51 serving to establish operative connections between the constantly rotating shaft upon which the cams are mounted and the cams.

The magnets 34 which move the standing pins temporarily from the alley bed out of the way of the sweeper are energized during the removal of deadwood by a separate circuit. This circuit comprises a wire 179 leading from the wire 171 through the ten magnets 34 to a switch 181 which is normally maintained in open position by the detent 165 engaging the rod 166. One terminal 182 of the switch 181 is mounted upon the end of a lever 183 and to this end of the lever a rod 184 is fixed. The rod 184 is supported from the rod 166 when the latter is in upper position by a link 185 rigidly fastened to the rod 166, whereby the lever 183 is prevented from moving to close the switch so long as the detent engages the rod 166. The downward movement of the rod 166, which through suitable connections changes the arrangement of the cams from the position for setting the pins (their normal position) to the position for the removal of deadwood, as heretofore described, leaves the rod 184 unsupported.

A spring 186 acting upon the end of the lever distant from the switch yieldingly pushes the lever 183 about its fulcrum 183' to close the switch 181. An outwardly extending arm 187 is fastened upon this end of the lever and bears against the cam 43. The cam 43 is adapted to prevent the spring 186 from closing the switch except throughout a predetermined portion of the rotation of the cam. From the switch 181 a wire 188 leads to the main line wire 172 completing the circuit for the lifting magnets, and if it is thought desirable a blowout 189 may be interposed in the circuit. No movement of the lever 183 can occur to close the switch 181 until the rod 184 is unsupported by the rod 166 and not then until the arm 187 rides over a proper portion of the cam 43. As the rod 166 is not released during the operation of the pin setting machine in placing a new set of pins upon the alley, the magnets 34 can not be energized during this operation and as the switch may only be closed when the arm 187 rides over proper portions of the cam 43, the proper construction of this cam will only permit the magnets 34 to be energized throughout the time when they lift the standing pins above the alley during the removal of deadwood.

From the switch button 176 a wire 191 leads to a spring contact finger 192 carried by the distributing frame. A metallic contact post 193 is mounted in the pin setter frame in position to contact with the finger 192 when the pin setter frame is in upper or normal position. This post is connected by a wire 194 with a fixed terminal 195 mounted beneath and secured to one of the pivotally mounted guides 159. Beneath this guide and in position to contact with the terminal 195 is provided a leaf switch 196. The switch 196 is normally held against the terminal 195 by a stud 197 which extends through a suitably formed aperture in the guide in position to contact with a pin carried by the guide and be pressed against the switch 196, keeping it in contact with the terminal 195. From the switch 196 a wire 197 leads to a metallic contact post 198 carried by the pin setter frame in position to contact with a finger 199 when the frame is in upper or normal position and from the finger 199 a wire 201 leads to the main line wire 172, completing the circuit.

It will be noted that unless there are pins resting in the pin setter frame so that the stud 197 will press the switch 196 into contact with the terminal 195, the circuit controlling the action of the pin setting machine in resetting the pins can not be completed and that when the pin setter frame is out of normal position the circuit will be open between the posts 193, 198 and the fingers 192, 199. The pressing of the re-set button will therefore produce no effect when the pin setter frame is out of normal position or when it is empty.

When the pin setter frame returns to upper or normal position after re-setting the pins upon the alley bed a circuit which will now be described is automatically closed, if pins are carried in the distributer, to energize the magnet 158 so that the lattice-like support may be moved from beneath the pins in the distributing frame to permit their delivery to the pin setter. A wire 202 leads from the main line wire 171 to the magnet 158 and from the magnet 158 a wire 203 leads to the front bracket 149 supporting the lattice-like support. A leaf switch 205 upon which the forward end of the lattice-like support 145 rests is connected by a wire 206 with a spring contact finger 207 mounted in the distributing frame. A metallic contact post 208 is mounted in the pin setter frame in position to contact with the finger 207 when the pin setter frame is in normal position and this post is connected by a wire 209 with a fixed terminal 211 carried beneath the guide 159 provided with the switch 196 in position to contact with the said switch when the pin setter frame is empty. From the terminal 196 the circuit is completed through the wire 197, the post 198, the finger 199 and the wire 201, connecting the finger 199 with the main line wire 171. The spring 205 is of sufficient strength to maintain the end of the lattice-like support elevated above the bracket 149, but is not of sufficient strength to prevent a set of pins resting upon the support from depressing its end into contact with the bracket 149. It is therefore necessary that a set of pins be carried in the distributing frame before the circuit just described can be closed at this point so that there is no danger of the lattice-like support not being in position to receive a set of pins when they are delivered to the distributer from the assembly shelf. The switch 196 is flexible and bears against the terminal 195 when pins are not carried in the pin setter frame, being pressed away from said terminal by the stud 197 when the said stud is pressed by a pin resting on the guide. Thus it will be seen that when pins are carried by the pin setter frame the circuit for energizing the magnet 158 is open between the switch 196 and the terminal 195 so that no pin can be delivered to the pin setter frame when the pin setter already contains a charge of pins. When the pin setter frame is out of upper position the circuit is broken between the posts 198, 208 and the fingers 199, 207 so that the distributer is prevented from delivering a set of pins to the pin setter when the pin setter has been moved to position adjacent the alley or to position adjacent the heads of standing pins.

The circuit for energizing the magnet 135 which, when energized, releases the assembly shelf comprises a wire 212 leading from the main line wire 171 to a terminal 213 mounted upon the shelf. A terminal 214 carried by the shelf in position to contact with the terminal 213 is connected to the magnet 153 by a wire 215 and a wire 216 leads from the magnet to the main line wire 172. The end of an arm 217 pivotally mounted upon the shelf is connected to the terminal 214 and has an end 218 positioned to be engaged by the foremost pin of a set when the last pin of the set is received by the shelf. When the foremost pin of the set engages the end 218 the arm is moved about its pivotal axis and brings the terminal 214 into contact with the terminal 213, thus automatically completing the circuit when a full set of pins is positioned upon the assembly shelf to permit the set of pins to be deposited in the distributer as previously described.

I believe at present that the most rapid and efficient operation of the pin setting machine herein before described is possible when twenty-nine pins are employed in connection therewith. This number permits ten pins to rest in the pin setter frame, ten in the distributing frame and nine upon the assembly shelf. When the re-set button is pressed the set of pins carried by the pin setter frame is deposited in proper position upon the alley bed and the set carried in the distributer is automatically delivered to the pin setter frame when the latter returns to normal position. As soon as a ball is rolled along the alley and knocks down one or more pins these pins are conveyed singly to the assembly shelf, the first pin to arrive there completing the set and causing it to be discharged into the distributer ready to be delivered to the pin setter. The other nine pins of the set on the alley are carried to the assembly shelf and await the addition of the first pin of the next set when they will be delivered with this additional pin into the distributer as just described. The various electrical circuits prevent a set of pins from being advanced from one mechanism to another until the mechanism receiving the set is empty and in position for its reception.

It is thought that the invention will be understood without further description and it is apparent that numerous changes may be made in the form, construction and arrangement of parts without departing from the spirit or scope of the invention or sacrificing any of its advantages, the form herein before disclosed being merely one preferred embodiment thereof.

I claim:

1. In a pin setting machine for a bowling alley, the combination of a pin setter adapted to place a set of pins in proper position upon the alley bed, a transfer mechanism, means for delivering the pins from the alley pit to the transfer mechanism, an assembler, an elevating mechanism for taking the pins from the transfer mechanism and carrying them to the assembler, and means for transferring the pins from the assembler to the pin setter.

2. In a pin setting machine for a bowling alley, the combination of a pin setter adapted to place a set of pins in proper position upon the alley bed, means for removing pins from the alley bed into the alley pit, a transfer mechanism, means for delivering the pins from the alley pit to the transfer mechanism, an assembler, an elevating mechanism for taking the pins from the transfer mechanism and carrying them to the assembler, and means for transferring the pins from the assembler to the pin setter.

3. In a pin setting machine for a bowling alley, the combination of a pin setter adapted to place a set of pins in proper position upon the alley bed, a transfer mechanism, means for delivering pins from the alley pit to the transfer mechanism, an assembler, an elevating mechanism for taking the pins from the transfer mechanism and delivering them singly to the assembler, and means for simultaneously transferring a full set of pins from the assembler to the said pin setter.

4. In a pin setting machine for a bowling alley, the combination of conveyer means in the alley pit, a continuously rotating element to receive the pins as they are discharged from the conveyer means, and means coöperating with said continuously rotating element for elevating the pins above the pit.

5. In a pin setting machine for a bowling alley, the combination of a pin setter adapted to place a set of pins in proper position upon the alley bed, a rotatable element, means for delivering the pins from the alley pit to the rotatable element, an assembler, an elevating mechanism for receiving the pins from the rotatable element and carrying them to the assembler, and mechanism for transferring the pins from the assembler to the said pin setter.

6. In a pin setting machine for a bowling alley, the combination of a pin setter adapted to place a set of pins in proper position upon the alley bed, means for removing the pins from the alley bed into the alley pit, a rotatable element, means for delivering the pins from the alley pit to the rotatable element, an assembler, an elevating mechanism for receiving the pins from the rotatable element and carrying them to the assembler, and mechanism for transferring the pins from the assembler to the said pin setter.

7. In a pin setting machine for a bowling alley, the combination of a pin setter adapted to place a set of pins in proper position upon the alley bed, a continuously moving transfer mechanism, a continuously moving means for delivering the pins from the alley pit to the transfer mechanism, an assembler, a continuously actuated elevating mechanism for receiving the pins from the transfer mechanism and carrying them to the assembler, and intermittently actuated mechanisms for transferring the pins from the assembler to the pin setter.

8. In a pin setting machine for a bowling alley, the combination of a pin setter adapted to place a set of pins in proper position upon the alley bed, means for removing the pins from the alley bed into the alley pit, a continuously moving transfer mechanism, a continuously moving means for delivering the pins from the alley pit to the transfer mechanism, an assembler, a continuously actuated elevating mechanism for receiving the pins from the transfer mechanism and carrying them to the assembler, and intermittently actuated mechanisms for transferring the pins from the assembler to the pin setter.

9. In a pin setting machine for a bowling alley, the combination of a pin setter adapted to set the pins in proper position upon the alley bed, and means for taking the pins from the alley pit and delivering them to the setter, said means comprising a conveyer disposed in the bottom and at one side of the pit and continuously moving longitudinally of the alley toward the rear of the pit, and a second conveyer also mounted in the bottom of the pit and continuously moving transversely of the alley toward the first mentioned conveyer.

10. In a pin setting machine for a bowling alley, the combination of a pin setter adapted to set the pins in proper position upon the alley bed, and means for taking the pins from the alley pit and delivering them to the setter, said means comprising a conveyer disposed in the bottom and at one side of the pit and continuously moving longitudinally of the alley toward the rear of the pit, a second conveyer also mounted in the bottom of the pit and continuously moving transversely of the alley toward the first mentioned conveyer, and means for directing pins falling from the alley bed into the alley pit onto the said conveyers.

11. In a pin setting machine for a bowling alley, the combination of a pin setter adapted to place a set of pins in proper position upon the alley bed, and means for taking the pins from the alley pit and delivering them to the pin setter, said means comprising a rotatable drum adapted to elevate the pins above the alley pit, and means delivering the pins from the alley pit into said drum.

12. In a pin setting machine for a bowling alley, the combination of a pin setter adapted to place a set of pins in proper position upon the alley bed, and means for taking the pins from the alley pit and delivering them to the pin setter, said means comprising a casing, and a drum mounted in the casing and adapted to elevate the pins to the top of the casing.

13. In a pin setting machine for a bowling alley, the combination of a pin setter adapted to place a set of pins in proper position upon the alley bed, and means for taking the pins from the alley pit and delivering them to the pin setter, said means comprising a casing, a pin receiving device at the top of the casing, and a drum rotatably mounted within the casing adapted to lift the pins singly to the pin receiving device.

14. In a pin setting machine for a bowling alley, the combination of a pin setter adapted to place a set of pins in proper position upon the alley bed, and means for taking the pins from the alley pit and delivering them to the pin setter, said means comprising a rotatable drum, a casing in which the said drum rotates, means mounted in the drum for carrying the pins to the top of the casing during the rotation of the drum, and a shelf at the top of the casing in position to receive the pins from the drum.

15. In a pin setting machine for a bowling alley, the combination of a pin setter adapted to place a set of pins in proper position upon the alley bed, and means for taking the pins from the alley pit and delivering them to the setter, said means comprising a constantly rotating drum having two side walls, one of which is provided with an opening through which the pins may pass into the drum, and connections between the side walls adapted to engage and lift the pins.

16. In a pin setting machine for a bowling alley, the combination of a pin setter adapted to place a set of pins in proper position upon the alley bed, and means for taking the pins from the alley pit and delivering them to the said setter, said means comprising a constantly rotating shaft, and a drum embracing the said shaft and rigidly connected thereto by a single side wall.

17. In a pin setting machine for a bowling alley, the combination of a pin setter adapted to place a set of pins in proper position upon the alley bed, and means for taking the pins from the alley pit and delivering them to the setter, said means comprising a constantly rotating shaft, a drum mounted upon the shaft and having two side walls, one side wall rigidly connected to the shaft and the other side wall provided with an opening through which pins may be delivered into the drum, and connections between the side walls for rigidly connecting the side walls together and for engaging and lifting the pins.

18. In a pin setting machine for a bowling alley, the combination of a pin setter adapted to place a set of pins in proper position upon the alley bed, and means for taking the pins from the alley pit and delivering them to the setter, said means comprising an inclined shelf mounted above the alley pit, means for lifting the pins to the upper end of said shelf in position to roll down the shelf and means located intermediate the ends of the shelf for turning the pins so that they reach the lower end of the shelf butt end foremost and with their longitudinal axes disposed longitudinally of the shelf.

19. In a pin setting machine for a bowling alley, the combination of a pin setter adapted to place a set of pins in proper position upon the alley bed, and means for taking the pins from the alley pit and delivering them to the setter, said means comprising an inclined shelf mounted above the alley pit, means for depositing a pin upon the upper end of the shelf with its longitudinal axis disposed transversely of the shelf, and a projection extending upwardly from the side of the shelf in position to engage the head of the pin as it rolls down the shelf to turn the pin so that it reaches the bottom of the shelf butt end foremost and with its longitudinal axis disposed longitudinally of the shelf.

20. In a pin setting machine for a bowling alley, the combination of a pin setter adapted to place a set of pins in proper position upon the alley bed, and means for taking the pins from the alley pit and delivering them to the setter, said means comprising an inclined shelf located above the pit, means for delivering a pin to the upper end of the shelf with the longitudinal axis of the pin disposed transversely of the shelf, and an upwardly extending projection disposed at each side of the shelf and intermediate the ends of the shelf and positioned so that the head of the pin will engage one of said projections as the pin rolls down the shelf, turning the pin so that it reaches the bottom of the shelf butt end foremost and with its longitudinal axis disposed longitudinally of the shelf.

21. In a pin setting machine for a bowling alley, the combination of a pin setter adapted to place a set of pins in proper position upon the alley bed, and means for taking the pins from the alley pit and delivering them to the setter, said means comprising an inclined shelf located above the pit, means for delivering the pins to the shelf, and an abutment located at the lower end of the shelf and spaced therefrom for retaining the pins in position upon the shelf.

22. In a pin setting machine for a bowling alley, the combination of a pin setter adapted to place a set of pins in proper position upon the alley bed, and means for taking the pins from the alley pit and delivering them to the setter, said means comprising an inclined shelf mounted above the pit, means for depositing the pins on the shelf, an abutment spaced from the shelf for retaining the pins in position thereon, and means moving between the abutment and shelf for elevating the pins.

23. In a pin setting machine for a bowling alley, the combination of a pin setter adapted to place a set of pins in proper position upon the alley bed, and means for taking the pins from the alley pit and delivering them to the setter, said means comprising an inclined shelf mounted above the pit and having a longitudinally disposed aperture at its end, means for elevating the pins singly to the shelf, and means traveling upward past the lower end of the shelf and passing through the said apertures in the shelf for elevating the pins as fast as they are delivered to the shelf.

24. In a pin setting machine for a bowling alley, the combination of a pin setter adapted to place a set of pins in proper position upon the alley bed, and means for taking the pins from the alley pit and delivering them to the setter, said means comprising an inclined shelf located above the pit, means for elevating the pins singly to the shelf, and a plurality of carriers continuously moving past the lower end of the shelf for elevating the pins as fast as they are delivered to the shelf.

25. In a pin setting machine for a bowling alley, the combination of a pin setter adapted to place a set of pins in proper position upon the alley bed, and means for taking the pins from the alley pit and delivering them to the setter, said means comprising an inclined shelf located above the pit and having a longitudinally disposed aperture at its end, means for elevating the pins singly to the shelf, and a plurality of carriers continuously moving upwardly past the lower end of the shelf for elevating the pins as fast as they are delivered to the shelf, each of said carriers having a finger adapted to pass through said aperture and a finger adapted to pass upon each side of said shelf.

26. In a pin setting machine for a bowling alley, the combination of a pin setter adapted to place a set of pins in proper position upon the alley bed, and means for taking the pins from the alley pit and delivering them to the setter, said means comprising an inclined shelf located above the pit, means for elevating the pins singly to the shelf, a pair of vertically traveling belts, and a plurality of carriers carried between and movable with said belts, the movement of said belts carrying the carriers upwardly past and adjacent the lower end of the shelf.

27. In a pin setting machine for a bowling alley, the combination of an inclined shelf located above the alley pit, means for lifting a ball onto the said shelf, means for preventing the ball from rolling off the shelf, and means for delivering the ball onto the alley return track.

28. In a pin setting machine for a bowling alley, the combination of an inclined shelf located above the pit, the lower portion of said shelf being curved to prevent the ball from rolling off at the sides of the shelf, means for preventing the ball from rolling off the lower end of the shelf, and means for lifting the ball from the said shelf onto the said return track.

29. In a pin setting machine for a bowling alley, the combination of an inclined shelf located above the pit, an inclined member having its upper end disposed adjacent the return track and its lower end disposed adjacent the lower end of said shelf to form an abutment for the ball and retain it in position to be elevated to the return track of the alley, and a continuously and vertically moving carrier traveling between the shelf and the inclined member and adapted to engage the ball and roll it up the inclined member and over the end of said member onto the return track.

30. In a pin setting machine for a bowling alley, the combination of an inclined shelf adapted to receive the balls, means for depositing the balls on said shelf, an inclined member having its lower end disposed adjacent the lower end of the shelf and leading to the return track of the alley, a pair of vertically traveling belts, and transverse members carried by said belts in position to pass between the end of the shelf and said inclined members and adapted to engage a ball and roll it up the inclined member and over its end onto the return track.

31. In a pin setting machine for a bowling alley, the combination of a pin setter adapted to place a set of pins in proper position upon the alley bed, and means for taking the pins from the alley pit and delivering them to the setter, said means comprising a shelf mounted above the alley pit, means for depositing the pins upon said shelf, a chute above the setter, and a conveyer for lifting the pins from the shelf and depositing them in said chute.

32. In a pin setting machine for a bowling alley, the combination of a pin setter adapted to place a set of pins in proper position upon the alley bed, and means for taking the pins from the alley pit and delivering them to the setter, said means comprising a vertically movable belt, and a plurality of cup shaped carriers fastened to and movable with the belt, each of said carriers being adapted to receive and elevate a pin.

33. In a pin setting machine for a bowling alley, the combination of a pin setter adapted to place a set of pins in proper position upon the alley bed, and means for taking the pins from the alley pit and delivering them to the setter, said means comprising a pair of belts and a curved member fastened to and extending transversely of the belts, and a plurality of forwardly extending curved fingers secured to said member, said fingers and member forming a carrier adapted to contain and elevate a pin.

34. In a pin setting machine for a bowling alley, the combination of a pin setter adapted to place a set of pins in proper position upon the alley bed, and means for taking the pins from the alley pit and delivering them to the setter, said means comprising a pair of vertically movable belts, a member fastened at its end to said belts, and a plurality of outwardly extending curved fingers secured to said member, said member and fingers forming a carrier of cup shaped form adapted to receive and elevate a pin.

35. In a pin setting machine for a bowling alley, the combination of a pin setter adapted to place a set of pins in proper position upon the alley bed, and means for taking the pins from the alley pit and delivering them to the setter, said means comprising a pair of vertically movable belts, a member disposed within the travel of and extending between the belts, means connecting the ends of said member to the belts, and a plurality of fingers secured to said member and extending outwardly of the belts, said member and fingers forming a carrier adapted to contain and elevate a pin.

36. In a pin setting machine for a bowling alley, the combination of a pin setter adapted to place a set of pins in proper position upon the alley bed, and means for taking the pins from the alley pit and delivering them to the setter, said means comprising a chute mounted above the setter and a belt arranged to travel vertically to a position above the chute and substantially horizontally over the chute, and a plurality of carriers carried by the belt and adapted to receive and elevate the pins during the vertical travel of the belt and to deposit them gently into the chute during its travel over the chute.

37. In a pin setting machine for a bowling alley, the combination of a pin setter adapted to place a set of pins in proper position upon the alley bed, and means for taking the pins from the alley pit and delivering them to the setter, said means comprising an assembly shelf adapted to receive the pins, means for delivering the pins singly to said shelf, and electrically controlled means for tilting the shelf when a full set of pins has been assembled thereon.

38. In a pin setting machine for a bowling alley, the combination of a pin setter adapted to place a set of pins in proper position upon the alley bed, and means for taking the pins from the alley pit and delivering them to the setter, said means comprising a pivotally mounted shelf, means for delivering the pins singly to the shelf, a rigid plate mounted beneath the shelf, a member connected to the shelf and engaging the plate to retain the shelf in horizontal position, and means for moving said member out of engagement with the plate when a full set of pins has been assembled upon the shelf.

39. In a pin setting machine for a bowling alley, the combination of a pin setter adapted to place a set of pins in proper position upon the alley bed, and means for taking the pins from the alley pit and delivering them to the setter, said means comprising a pivotally mounted assembly shelf, means for delivering the pins singly to said shelf, a supporting member connected to the bottom of the shelf and extending downwardly therefrom, means for engaging the supporting member to retain the shelf in horizontal position, and a magnet connected to said member and adapted to disengage the member from the retaining means when a full set of pins has been collected upon the shelf.

40. In a pin setting machine for a bowling alley, the combination of a pin setter adapted to place a set of pins in proper position upon the alley bed, and means for taking the pins from the alley pit and delivering them to the setter, said means comprising a pivotally mounted shelf adapted to receive the pins with their butt ends disposed adjacent the pivotal axis of the shelf, and means for delivering the pins to the shelf in this position.

41. In a pin setting machine for a bowling alley, the combination of a pin setter adapted to place a set of pins in proper position upon the alley bed, and means for taking the pins from the alley pit and delivering them to the setter, said means comprising a pivotally mounted shelf normally held in horizontal position and provided with an aperture of sufficient size to permit a pin to pass endwise therethrough, means for positioning a pin upon the shelf with its longitudinal axis extending across the aperture, means for releasing the shelf to permit it to tilt and the pin to slide therefrom, and means for limiting the sliding movement of the pin and directing an end of the pin through said aperture whereby the pin slides first forwardly and partly off the shelf, and then rearwardly through the aperture when the shelf is tilted.

42. In a pin setting machine for a bowling alley, the combination of a pin setter adapted to place a set of pins in proper position upon the alley bed, and means for taking the pins from the alley pit and delivering them to the setter, said means comprising a pivotally mounted shelf normally held in horizontal position and provided with an aperture of sufficient size to permit a pin to pass endwise therethrough, means for positioning a pin upon the shelf with its longitudinal axis extending across the aperture, means for releasing the shelf to permit it to tilt and the pin to slide therefrom, and an inclined chute across which said shelf is adapted to extend when in tilted position, the end of the chute being disposed in position to engage the end of the pin as it slides from the shelf to direct the other end of the pin through said aperture whereby the pin slides first against the upper end of the chute and then through the aperture and down the chute beneath the shelf.

43. In a pin setting machine for a bowling alley, the combination of a pin setter adapted to place a set of pins in proper position upon the alley bed, and means for taking the pins from the alley pit and delivering them to the setter, said means comprising a pivotally mounted shelf adapted to be tilted when the last pin of a set is received thereby, means for depositing the pins on the shelf, a distributer mounted above the setter, and a plurality of inclined chutes having their ends extending adjacent and below the free edge of the shelf when the latter is in tilted position and passing under the said shelf, the ends of the chutes serving as abutments for the pins as they slide from the shelf and causing the pins to slide down the chutes beneath the shelf in position to be delivered from the distributer into the pin setter.

44. In a pin setting machine for a bowling alley, the combination of a pin setter adapted to place a set of pins in proper position upon the alley bed, and means for taking the pins from the alley pit and delivering them to the setter, said means comprising a shelf adapted to support a set of pins disposed transversely of the machine and pivotally mounted along its edge adjacent the player's end of the alley and provided with a plurality of apertures therethrough, a distributing frame disposed directly beneath the shelf, ten inclined chutes for receiving the pins when the shelf is tilted and depositing them in proper position in the distributing frame, a number of said chutes equal to the number of apertures in the shelf having their ends disposed above and adjacent the lower edge of the shelf, when the latter is tilted in position to engage the ends of pins disposed over the apertures to prevent the pins from sliding completely from the shelf and causing the pins to slide through the apertures and down the chutes into desired position in the distributing frame, and the remaining chutes having their ends disposed opposite the lower edge of the said shelf when in tilted position and further from the shelf than the ends of the other chutes to cause the pins to slide wholly off the shelf and down the chutes into desired position.

45. In a pin setting machine for a bowling alley, the combination of a pin setter adapted to place a set of pins in proper position upon the alley bed, means for removing fallen pins from the alley bed, and means located rearwardly of said pin setter and removing means, and connected thereto for controlling and timing the action of said setter and said removing means.

46. In a pin setting machine for a bowling alley, the combination of a main frame, a movable pin setter frame, means for removing fallen pins from the alley, both the movable frame and said means being mounted in the main frame, and means located rearwardly of the main frame from the player's end of the alley for controlling and timing the action of the movable frame and the removing means.

47. In a pin setting machine for a bowling alley, the combination of a main frame, a movable pin setter frame, means for removing fallen pins from the alley, both the movable frame and said means being mounted in the main frame, and means located rearwardly of the main frame and rearwardly of the alley pit for controlling and timing the actions of both the movable frame and said removing means.

48. In a pin setting machine for a bowling alley, the combination of a pin setter adapted to place a set of pins in proper position upon the alley bed, and means for taking the pins from the alley pit and delivering them to the setter, said means comprising a pivotally mounted shelf, means for maintaining the shelf in horizontal position, means for depositing the pins upon the shelf, a magnet for releasing the retaining means when a full set of pins has been collected upon the shelf, a source of electrical energy, a circuit connecting the magnet and said source, and means maintaining the circuit open until the last pin of the set is received upon the shelf.

49. In a pin setting machine for a bowling alley, the combination of a pin setter adapted to place the pins in proper position upon the alley bed, and means for taking the pins from the alley pit and delivering them to the setter, said means comprising a pivotally mounted shelf, means for retaining the shelf in horizontal position, means for depositing the pins singly upon the shelf, a magnet for releasing the retaining means after a full set of pins has been collected upon the shelf, a source of electrical energy, a normally open switch mounted upon the shelf in position to be closed by movement of the foremost pin when the last pin of the set is received by the shelf, a conductor leading from said source through the magnet to said switch, and another conductor leading from said switch to said source.

50. In a pin setting machine for a bowling alley, the combination of a rotating element to receive the pins from the alley pit, and means coöperating with said rotating element for elevating the pins above the pit.

51. In a bowling alley pin setting apparatus, a pin separator consisting of a cylindrical casing, a wheel rotatably mounted in said casing, and conveyer blades secured to said wheel, said conveyer blades forming pockets with the side of the casing.

52. In a pin setting machine for a bowling alley, a pin separator comprising a cylindrical casing having a wheel revolubly mounted therein, blades secured to said wheel having angular faces, one of the faces forming with the side of the casing pockets to carry the pins, and the other face positioned so as to prevent more than one pin being carried by the adjoining pocket.

ERNEST HEDENSKOOG.

Witnesses:
MILTON F. MILLER,
FRANKLIN M. WARDEN.